United States Patent [19]

Talvalkar

[11] Patent Number: 5,006,863

[45] Date of Patent: Apr. 9, 1991

[54] MULTIPLE COPY THERMAL IMAGING

[75] Inventor: Shashi G. Talvalkar, Kettering, Ohio

[73] Assignee: NCR Corporation, Dayton, Ohio

[21] Appl. No.: 307,456

[22] Filed: Feb. 8, 1989

Related U.S. Application Data

[63] Continuation-in-part of Ser. No. 87,543, Jul. 6, 1987, abandoned.

[51] Int. Cl.[5] ........................ G01D 9/00; B29C 47/00; B41M 3/12; B41M 5/20; G03C 5/18

[52] U.S. Cl. .................................. 346/1.1; 346/76 R; 346/76 PH; 101/470; 156/234; 156/244.16; 156/244.17; 427/146; 427/148; 428/204; 428/322.2; 428/690; 428/692; 428/900; 428/913; 428/914; 428/341; 430/142; 430/253; 430/348; 430/944; 430/293; 430/964; 503/201; 503/203; 503/214

[58] Field of Search ................. 346/1.1, 76 R, 76 PH; 101/470; 427/195-198, 150, 157, 256, 288, 141, 128; 428/202-208, 322.2, 341, 329, 488.1, 488.4, 690, 692, 694, 900, 913, 914; 430/138, 142, 151, 253, 254, 348, 363, 495, 944, 964, 293; 503/201, 203, 208, 209, 214; 156/234, 244.16, 244.17

[56] References Cited

U.S. PATENT DOCUMENTS

| | | | |
|---|---|---|---|
| 2,663,654 | 12/1953 | Miller et al. | 430/340 |
| 2,813,043 | 11/1957 | Clark | 430/644 |
| 3,539,375 | 11/1970 | Baum | 503/214 |
| 3,561,991 | 2/1971 | Baum | 428/204 |
| 3,674,535 | 7/1972 | Blose et al. | 503/211 |
| 3,706,276 | 12/1972 | Yamada et al. | 101/453 |
| 4,157,412 | 6/1979 | Deneau | 428/147 |
| 4,446,467 | 5/1984 | Takiguchi et al. | 346/76 PH |
| 4,463,034 | 7/1984 | Tokunaga et al. | 427/256 |
| 4,472,479 | 9/1984 | Hayes et al. | 428/324 |
| 4,523,207 | 6/1985 | Lewis et al. | 346/214 |
| 4,533,596 | 8/1985 | Besselman | 428/341 |
| 4,555,427 | 11/1985 | Kawasaki et al. | 428/195 |
| 4,580,142 | 4/1986 | Matsushita et al. | 346/161 |

FOREIGN PATENT DOCUMENTS

| | | |
|---|---|---|
| 57-2794 | 1/1982 | Japan . |
| 58-51193 | 3/1983 | Japan . |
| 62-87388 | 4/1987 | Japan . |

*Primary Examiner*—Benjamin R. Fuller
*Assistant Examiner*—Gerald E. Preston
*Attorney, Agent, or Firm*—Wilbert Hawk, Jr.; Albert L. Sessler, Jr.; George J. Muckenthaler

[57] ABSTRACT

A heat sensitive copy system uses a magnetic thermal transfer ribbon to transfer images onto an adjacent medium and near infra-red energy is used to transfer the images from the medium onto thermal paper or onto translucent paper for producing multiple copies in a manner which is not thickness sensitive.

19 Claims, 1 Drawing Sheet

MULTIPLE COPY THERMAL IMAGING

CROSS-REFERENCE TO RELATED APPLICATION

This is a continuation-in-part of copending application Ser. No. 87,543, filed on July 6, 1987 abandoned, the subject matter of which is incorporated herein by reference.

BACKGROUND OF THE INVENTION

In the field of thermal printing, it is well-known that a significant limitation in the printing operation is the absence of copies during such printing operation. The early thermal printing systems used a thermal print element energized to heat specific and precise areas of a heat-sensitive paper or like record material and thereby produce readable characters on the single sheet of paper. In this respect, the single sheet of paper includes material which is reactive to the applied heat and is described as a self-contained system.

More recently, thermal printing systems have included two separate sheets of paper or like record material, wherein each sheet is coated with a heat-sensitive reactive material. The top or front sheet is usually a light weight tissue-type paper which is coated with a heat-sensitive material and the second sheet is preferably bond-type paper which is also coated with the heat-sensitive material. The two sheets are then mated or collated in a manner wherein the uncoated side of the tissue paper is in contact with the coating on the bond paper. The coated side of the tissue paper is adjacent and in close proximity to the thermal printing elements, or in certain applications, the elements may be in actual contact with the tissue paper. The thermal elements are actuated to provide specific and precise marking or imaging on the papers in the process which enables the obtaining of a master sheet plus a readable copy.

Alternatively, the tissue paper could be coated on both the front and back sides so that the thermal printing elements are adjacent or in contact with the front coated side of the tissue paper and the back coating is in contact with the bond paper. In similar manner, the thermal elements are actuated to provide the specific and precise marking or imaging on the two papers so as to be in readable form. The tissue sheet and the bond sheet are arranged in manifold manner and the imaging is accomplished by transfer of the ink or like material in the coating onto the sheet.

Additionally, a method for producing a two ply thermal recording medium includes the use of a coating as an adhesive for laminating the sheets in a single operation.

Representative documentation in the field of thermal printing includes U.S. Pat. No. 3,539,375, issued to H. H. Baum on Nov. 10, 1970, which discloses temperature-responsive record material that includes a support sheet having crystal violet lactone and a phenolic disposed in a matrix of polyvinyl alcohol, and arranged such that application of heat will produce a mark-forming reaction between the lactone and the phenolic.

U.S. Pat. No. 3,561,991, issued to H. H. Baum on Feb. 9, 1971, discloses a transfer record sheet for making multiple copies of a single heat impression wherein the translucent support sheet is coated with an ink source that normally is solid at room temperature and meltable to a tacky transfer condition upon application of heat. The melted coating stays in the tacky condition for a period of time to allow the making of a succession of copies upon contact of sheets with the melted image area.

U.S. Pat. No. 3,674,535, issued to J. H. Blose et al. on July 4, 1972, discloses heat-sensitive record material comprising a paper base sheet and a coating of chromogenic material and a bisphenol distribution in a polyvinyl alcohol in combination with a filler, a lubricant and a non-tacky wax.

U.S. Pat. No. 4,523,207, issued to M. W. Lewis et al. on June 11, 1985, discloses a multiple copy thermal record sheet that includes a coating formulation on one sheet having a synthetic polyterpene binder in a mixture of thermochromic dye and phenolic resin.

U.S. Pat. No. 4,555,427, issued to S. Kawasaki et al. on Nov. 26, 1985, discloses a heat transferable sheet that has a receptive layer for receiving a dye and the layer has first and second regions with specific properties.

U.S. Pat. No. 4,853,256, issued to T. J. Obringer et al. on Aug. 1, 1989 discloses a method of forming a two ply thermal paper wherein a coating having thermoreactive characteristics is applied to the two sheets for transfer of the thermal image and for adhering the two sheets during lamination thereof in a single operation.

SUMMARY OF THE INVENTION

The present invention relates to thermal printing and to an improved system for making an original and at least one good record copy during the printing operation. More particularly, the invention is directed to the use of an improved thermal transfer coating containing a near infra-red absorbing pigment provided on one substrate such as a ribbon or the like, wherein the coating is transferred in the nature of images by a thermal print head or like means onto a receiving substrate as a first step of the multiple copy concept.

The second step of the process involves the use of the transferred image from the first step and the application of near infra-red energy to create an image thereof onto thermal paper. The second step may alternatively use the near infra-red energy to partially transfer the image onto the back side or contact side of translucent paper which image is readable when viewed through the translucent paper.

The composition of the heat-sensitive coating for the thermal transfer ribbon essentially consists of a resin, a wax, and a magnetic oxide or any other near infra-red absorbing pigment which is considered a key ingredient.

The thermal paper receiving sheet includes a coating which essentially consists of a dye, a phenolic resin, a wax, a fatty acid and a clay.

The receiving sheet can be plain paper of translucent type, of preferably smooth texture and surface, to receive the transferred image from the thermal transfer ribbon.

In view of the above discussion, a principal object of the present invention is to provide an improved in-line, image transfer copy system.

Another object of the present invention is to provide a low-cost thermal transfer original and a copy utilizing either thermal paper or translucent paper.

An additional object of the present invention is to provide an improved thermal transfer coating material on one surface of a record sheet and the transferring of material onto a record sheet for enabling a direct thermal paper copy system.

A further object of the present invention is to provide a transfer sheet and a coated thermal sheet, the coating being reactive upon application of heat to provide direct imaging.

Still another object of the present invention is to provide a thermal transfer coating applied to the surface of one sheet of a two sheet copy system, which coating is heated to record the image onto the one sheet and then to transfer the image onto the second sheet.

Still an additional object of the present invention is to provide means for creating an original and a copy by transferring coating material onto a substrate and then using near infra-red energy to create the copy of the transferred coating material onto thermal paper or onto translucent paper in an in-line or two-step sequential process.

Still a further object of the present invention is to provide a method for producing a multiple copy thermal recording system wherein the coating is transferred onto a substrate to use as an original or master sheet and then near infra-red energy is used to transfer the coating in the form of an image on a thermal sheet in one instance or on a translucent sheet in a second instance.

Additional advantages and features of the present invention will become apparent and fully understood from a reading of the following description taken together with the annexed drawing.

DESCRIPTION OF THE PREFERRED EMBODIMENT

Figure 1:
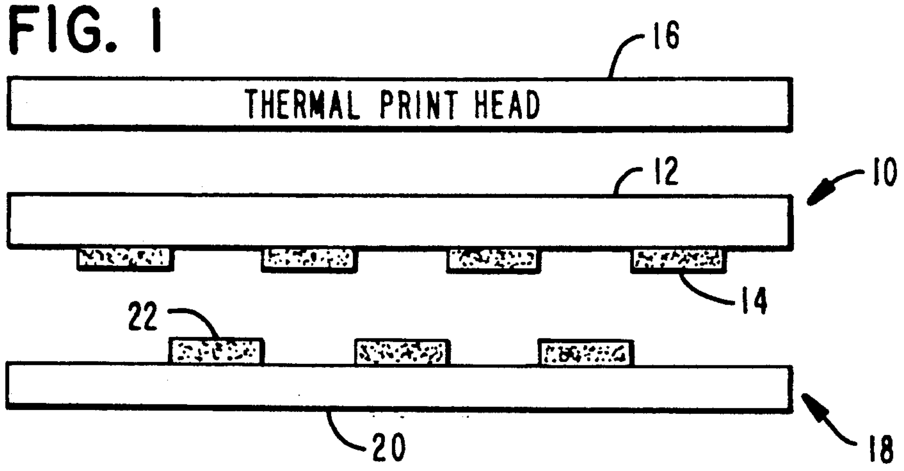
FIG. 1 is a diagrammatic view of the first step of the transfer process of the present invention.
Figure 2:
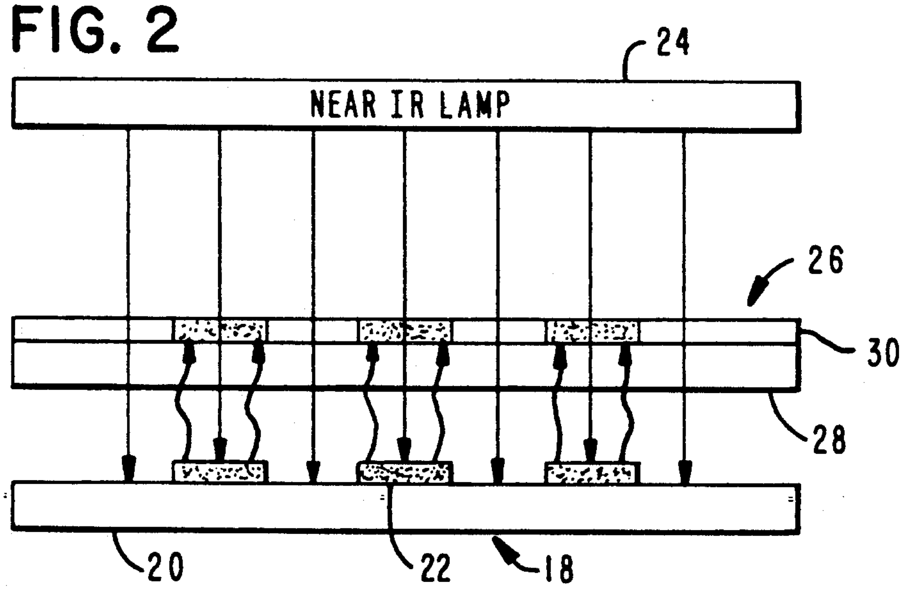
FIG. 2 is a diagrammatic view of one method of creating a copy by using a thermally sensitive paper.

FIGS. 1 and 2 illustrate in diagrammatic form the concept of a first process embodiment of the present invention wherein a thermal transfer ribbon 10 comprises a substrate 12 and a thermal transfer coating 14. In a first step of this process, a thermal print head 16 provides heat for transferring portions of the coating 14 onto a record medium 18 which comprises a smooth substrate 20 for receiving the coating material 14 in the form of images 22.

As shown in FIG. 2, the second step involves the use of the record medium 18 and the application of near infra-red energy from a lamp 24 for developing the image or images 22 onto a thermal paper 26. The thermal paper 26 comprises a substrate 28 and a coating 30 for developing or creating a copy of the image or images 22 in one manner or process. In this process, when the transferred image in step one is exposed to the near infra-red energy, the near infra-red absorbing pigment material, in the form of images 22, gets hot and acts as a heat energy source to create an image on the thermal paper 26.

Figure 3:
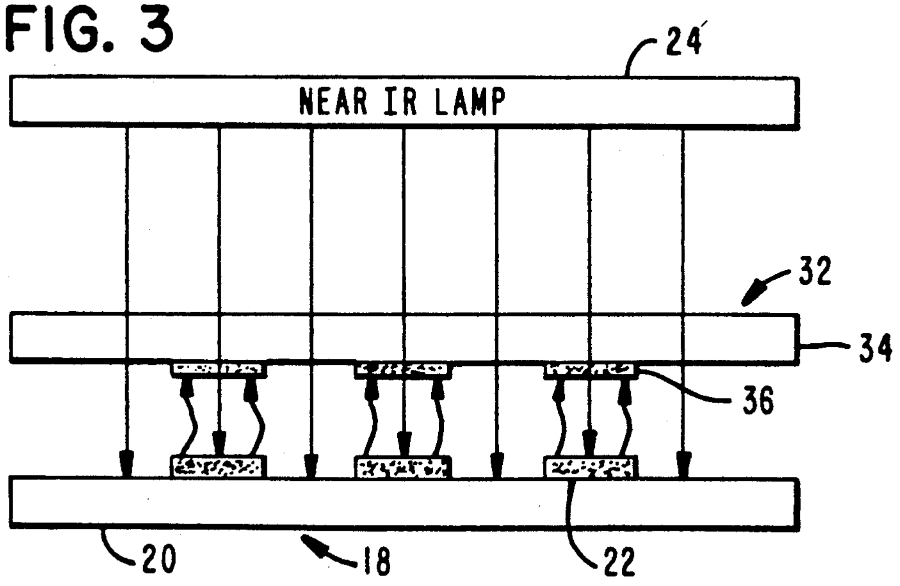
FIG. 3 is a similar view of another method of practicing the concept by using plain translucent paper.

A second process embodiment of the invention is shown in FIGS. 1 and 3 and utilizes the same first step as the first embodiment, namely the use of the record medium 18, followed by the second step of creating heated images 36 on a substrate 34 by absorbing the near infra-red energy, provided by the near infra-red lamp 24. The images 22, due to the absorption of the near infra-red energy, generate heat, remain or become tacky and are partially transferred to the contact side of the substrate 34 of the plain translucent paper 32, as seen in FIG. 3, thereby creating a readable copy when viewed through the paper 32.

Near infra-red is defined as that portion of the electromagnetic spectrum between the wavelengths of 0.8 and 3 microns or is that invisible radiation with wavelengths in the range between 8,000 angstroms and 30,000 angstroms.

EXAMPLE I

Example I describes the materials for use with the method wherein the coating 14 of thermal transfer material is applied to one side of the substrate 12.

Coating Composition

The thermal transfer coating formulation 14 for the substrate 12 essentially consists of a hydrocarbon or polyethylene resin, one or more waxes, and a magnetic oxide or any other near infra-red absorbing pigment. A preferred coating composition is as follows:

TABLE 1

| Material | Percent Dry Weight | Range |
|---|---|---|
| Ceramid Wax | 19.75% | 15-25% |
| WB-17 Wax | 19.75 | 15-25 |
| Polyethylene (AC-617) | 5.80 | 4-8 |
| Piccotex -75 | 4.70 | 3-7 |
| Iron Oxide | 48.00 | 40-60 |
| Soya Lecithin | 1.00 | 1-2 |
| Slip Aid | 1.00 | 1-2 |

The coating formulation 30 on the substrate 28 essentially consists of a dye, a phenolic resin, a wax, and a clay. A preferred coating composition is as follows:

TABLE 2

| Material | Percent Dry Weight | Range |
|---|---|---|
| Dye (Black or Blue) | 6% | 5-7% |
| Vinol 107 @12% Solids | 10.0 | 5-15 |
| Nopco NDW | 0.2 | 0-1 |
| Niaproof 08 | 0.1 | 0-1 |
| Tinopal PT | 4.0 | 3-5 |
| 4'4'Isopropylidenediphenol | 22.2 | 18-25 |
| Acrawax C | 8.0 | 6-10 |
| Armid HT | 1.0 | .5-1.5 |
| Ansilex Clay | 43.5 | 38-50 |
| Zinc Stearate | 2.0 | 1-3 |
| Titanox 2131 | 3.0 | 2-4 |

It is to be noted that while blue dye has been reasonably satisfactory in providing an acceptable imaging of thermal paper systems, the black dye provides better environmental stability (resistance to fading) and is considered to be the preferred composition.

The thermal transfer coating 14 is applied to the substrate 12 in the creation of the thermal transfer ribbon 10, and the receiving sheet 18 includes the substrate 20 for receiving the images 22. The coating 14 is in the range of four to five pounds dry weight per ream on substrate 12 and the coating 30 is in the range of three and one-half to five pounds dry weight per ream on substrate 28.

The concept of in-line, two-step, imaging in the present invention utilizes a combination of two technologies. The first technology used in the first step (FIG. 1) of each of the first and the second process embodiments involves the creation of a thermal print or image 22 by means of a thermal transfer ribbon 10 containing the coating 14 that includes the near infra-red absorbing material. The second step or phase of the first process embodiment involves the passing of a sandwich consisting of the thermal print or image 22 produced in the first step and a thermally reactive material sheet, such as thermal paper 26, under the near infra-red lamp 24 to create an image on the thermal paper (FIG. 2). As an alternative to the thermal paper in the second step of the second process embodiment, a translucent paper 32 may be used and the sandwich is passed under the lamp 24 to transfer an image 22 onto the contact side of the translucent paper wherein an image 36 is visible through the paper 32 (FIG. 3).

The overall concept of the present invention relies on the characteristic of absorbency of the near infra-red energy and converting this energy to heat to effect the copying operation. The near infra-red energy heats the thermal transfer images 22 and reactivates the thermally sensitive material, in the form of the images 22, thereby creating a readable image 36 through the translucent sheet 32, as in the case of the second process embodiment. The image 22 produced on the receiving substrate 20 (FIG. 1) requires the presence of near IR absorbing material in the coating 14 which becomes hot when exposed to the near IR lamp 24. In the case of the thermal paper 26 used in the first process embodiment, the thermally reactive material 30 reacts by reason of the hot dot or hot character to produce a clean, clear image on the paper 26 (FIG. 2). In the case of the translucent sheet 32, which does not contain a coating, the image 36 is created by a partial transfer of the transferred coating material, in the form of the images 22, from the receiving sheet 18 onto the back side of the translucent sheet 32 to provide a readable image 36 through such sheet (FIG. 3).

The present invention provides a method for making multiple in-line or two-step process copies by means of thermal printing equipment wherein such method eliminates the thickness sensitivity of materials currently used for multiple copy printing. In the various experiments completed when using the process of the present invention, a readable copy of the image 22 was produced when a 24 pound (24 inches by 36 inches—500 sheet ream) package of thermally coated sheets was employed with individual sheets thereof providing the thermal paper 26 (FIG. 2). The invention is practical and simple for use where a limited amount of space is available for the necessary hardware since the only device required in the housing enclosure of the thermal transfer printer is the near IR lamp 24.

The various ingredients utilized in the thermally transferrable coating 14 are further identified and are available from the noted sources. The Ceramid wax is a fatty acid derived amide wax available from Glyco Chemicals, Inc. and WB-17 is an oxidized, isocyanated hydrocarbon wax from Petrolite Corporation. AC-617 is a low molecular weight polyethylene available from Allied Chemical Corporation and Piccotex-75 is a hard, color stable, substituted styrene copolymer resin from Hercules, Inc. The iron oxide is available from BASF, the Soya Lecithin is a wetting agent, oil-like extract of soybean from Capricorn Chemical, and the Slip Aid is a 20% dispersion of polymeric or high melting point polyethylene wax in xylene from Daniel Products.

The coating composition 30 on the substrate 28 to make up the thermal paper 26 essentially consists of bisphenol (4,4-isopropyli-denediphenol), as a reactive material of the phenol group, which is available from Dow Chemical Company. The black color forming or chromogenic dye of the fluoran group is Pergascript from Ciba-Geigy Corporation, or S205 from Yamada Chemical Company, or N-102 from Hilton-Davis Company, and the Vinol 107 is a polyvinyl alcohol used as a binding material. The Acrawax C is a synthetic wax and is available from Glyco Inc., and the amide wax is Armid HT or Armoslip 18 from Armour Chemical Company. The filler may be calcium carbonate supplied by Georgia Marble Company, or the filler may be Ansilex clay supplied by Engelhard Corporation. Nopco NDW is a defoamer of the glycol group and is available from Diamond Shamrock Corp., Niaproof 08 is a sodium 2-ethylhexyl sulfate used as a wetting agent and is available from Niacet Corp., and Tinopal PT is a fluorescent brightener available from Ciba-Geigy Corporation. The titanium dioxide is a white pigment available from N.L. Industries (National Lead Corporation), and the zinc stearate is used as an anti-stick agent and is available from Witco Chemical Company. The example cited is a typical thermal sensitive composition or coating 30, which is capable of forming color in the preferred range of 180° to 200° F. Substitution of this thermal sensitive composition does not hinder the process as long as the color formation using heat energy can be achieved between 140° and 280° F.

It is thus seen that herein shown and described is a multiple copy thermal imaging system that utilizes a temperature-sensitive coating on one surface of a ribbon for transferring an image onto a receiving sheet and the receiving sheet is passed under a near infra-red lamp for creating a copy of the image. The present invention enables the accomplishment of the objects and advantages mentioned above, and while a first and a second embodiment of the invention have been disclosed herein, variations thereof may occur to those skilled in the art. It is contemplated that all such variations and modifications not departing from the spirit and scope of the invention hereof are to be construed in accordance with the following claims.

What is claimed is:

1. A method of forming multiple copy images and accomplished in a two-step, in-line process, the first step of such process further comprising the steps of:

providing a first substrate having a thermal transfer coating thereon, said thermal transfer coating including near infra-red energy absorbing material, providing a second substrate adjacent the first substrate, heating the thermal transfer coating on the first substrate in selective manner for transferring coating material from the first substrate onto the second substrate and creating original images on the second substrate in performing the first step of the two-step process, the second step of such process further comprising placing a receiving copy medium adjacent the second substrate, and passing near infra-red energy means over the receiving copy medium for heating the original images on the second substrate and transferring the images to the receiving copy medium and creating copies on said copy medium in performing the second step of the two-step process.

2. The method of claim 1 wherein the first substrate with the thermal transfer coating thereon comprises a thermal transfer ribbon.

3. The method of claim 1 wherein the energy means comprises a near infra-red lamp.

4. The method of claim 1 wherein the receiving copy medium comprises thermal paper and the coating images are transferred onto the thermal paper.

5. The method of claim 1 wherein the receiving copy medium comprises translucent paper and the coating images are partially transferred onto the back side of the translucent paper and the images are read through the translucent paper.

6. A heat sensitive copy system for creating an original image and a copy of said image and accomplished in a two-step, in-line process, said copy system comprising a first medium having a thermal transfer coating thereon, said thermal transfer coating including near infra-red absorbing material, a second medium adjacent the first medium, means for selectively heating a portion of the thermal transfer coating on the first medium for transferring coating material in the form of original images onto the second medium during the first step of the process, copy medium adjacent the second medium, and means producing near infra-red radiation for heating the original images on the second medium and transferring the original images therefrom onto the copy medium and creating copies of the original images on said copy medium during the second step of the process.

7. The copy system of claim 6 wherein the first medium with the thermal transfer coating thereon comprises a thermal transfer ribbon.

8. The copy system of claim 6 wherein the means for heating the coating on the first medium comprises a thermal print head.

9. The copy system of claim 6 wherein the means for heating the second medium comprises a near infra-red lamp.

10. The copy system of claim 6 wherein the copy medium comprises thermal paper.

11. The copy system of claim 6 wherein the copy medium comprises translucent paper.

12. The copy system of claim 6 wherein the coating on the first medium includes a wax, a hydrocarbon resin, and a magnetic oxide mixed in a solution of mineral spirits.

13. The copy system of claim 6 wherein the coating on the first medium essentially consists of an amide wax of about 15 to 25%, a synthetic wax of about 15 to 25%, a polyethylene resin of about 4 to 8% and a magnetic oxide of about 40 to 60%.

14. The copy system of claim 6 wherein the coating on the first medium essentially consists of an amide wax of about 15 to 25%, a synthetic wax of about 15 to 25%, a polyethlene resin of about 4 to 8%, a copolymer resin of about 3 to 7%, a magnetic oxide of about 40 to 60%, a wetting agent of about 1 to 2% and a dispersion of polymeric wax in xylene of about 1 to 2%.

15. The copy system of claim 10 wherein the thermal paper includes a coating thereon which essentially consists of a synthetic wax of about 6 to 10%, a filler of about 38 to 50%, a white pigment of about 2 to 4%, a color forming chromogenic dye of about 5 to 7%, a polyvinyl alcohol of about 5 to 15%, a fluorescent brightener material of about 3 to 5%, and a reactive material of about 18 to 25%.

16. A multiple copy, thermal imaging system for creating an original image and at least one copy of said image and accomplished in a two-step, in-line process, said imaging system comprising a first substrate having a thermal transfer coating on one surface thereof, said thermal transfer coating including near infra-red energy absorbing material, a second substrate adjacent the first substrate, means for heating selected portions of said thermal transfer coating on the surface of said first substrate for transferring the near infra-red energy absorbing material in the form of original images onto the second substrate during the first step of the process, a receiving copy medium adjacent the second substrate, and means producing near infra-red radiation in the range between 8,000 and 30,000 angstroms for heating the original images on the second substrate and transferring the original images therefrom and onto the receiving copy medium and creating copies on said copy medium during the second step of the process.

17. The thermal imaging system of claim 16 wherein the thermal transfer coating on the first substrate essentially consists of an amide wax of about 15 to 25%, a synthetic wax of about 15 to 25%, a polyethylene resin of about 4 to 8%, a copolymer resin of about 3 to 7%, and an iron oxide of about 40 to 60%.

18. The thermal imaging system of claim 16 wherein the receiving copy medium comprises thermal paper and the coating thereon essentially consists of a synthetic wax of about 6 to 10%, a filler of about 38 to 50%, a white pigment of about 2 to 4%, a color forming chromogenic dye of about 5 to 7%, a polyvinyl alcohol of about 5 to 15%, and a reactive material of about 18 to 25%.

19. The thermal imaging system of claim 16 wherein the receiving copy medium comprises translucent paper and the coating images are partially transferred onto the back side of the translucent paper and the images are read through the translucent paper.

* * * * *